(12) United States Patent
Carter

(10) Patent No.: US 12,468,268 B1
(45) Date of Patent: Nov. 11, 2025

(54) MACHINE-LEARNING BASED MONITORING OF PLASTIC RECYCLING

(71) Applicant: Ryan Carter, San Juan, PR (US)

(72) Inventor: Ryan Carter, San Juan, PR (US)

( * ) Notice: Subject to any disclaimer, the term of this patent is extended or adjusted under 35 U.S.C. 154(b) by 0 days.

(21) Appl. No.: 19/028,288

(22) Filed: Jan. 17, 2025

(51) Int. Cl.
| | |
|---|---|
| *G05B 13/02* | (2006.01) |
| *B29B 7/88* | (2006.01) |
| *B29B 17/00* | (2006.01) |
| *G05B 15/02* | (2006.01) |

(52) U.S. Cl.
CPC ............ *G05B 13/0265* (2013.01); *B29B 7/88* (2013.01); *B29B 17/00* (2013.01); *G05B 15/02* (2013.01); *Y02W 30/50* (2015.05); *Y02W 30/62* (2015.05)

(58) Field of Classification Search
CPC ... G05B 15/02; G05B 13/0265; Y02W 30/50; Y02W 30/62; B29B 17/00; B29B 7/88
USPC ........................................................ 700/47
See application file for complete search history.

(56) References Cited

U.S. PATENT DOCUMENTS

| | | | | |
|---|---|---|---|---|
| 2014/0101990 A1* | 4/2014 | Rhatigan | .................. | C10L 5/46 44/589 |
| 2014/0332994 A1* | 11/2014 | Danes | .................. | G01N 23/223 264/40.1 |
| 2022/0184588 A1* | 6/2022 | Zhao | ........................ | B01J 23/70 |
| 2023/0066052 A1* | 3/2023 | Richter | ..................... | C08J 11/16 |
| 2023/0192416 A1* | 6/2023 | Horowitz | ............... | B25J 9/1697 700/223 |
| 2024/0352214 A1* | 10/2024 | Hoekstra | ................... | B09B 3/35 |

FOREIGN PATENT DOCUMENTS

| | | | | | |
|---|---|---|---|---|---|
| CA | 3240732 A1 | * | 7/2023 | .......... | B01J 19/0006 |
| CN | 117341094 B | * | 6/2024 | .......... | B29B 13/022 |
| GB | 2572327 A | * | 10/2019 | .......... | B29C 64/386 |
| JP | 7280290 B2 | * | 5/2023 | ......... | B01D 11/0284 |
| WO | WO-2025016925 A1 | * | 1/2025 | ............. | B29B 17/02 |

(Continued)

OTHER PUBLICATIONS

From Trash to Cash: How AI and Machine Learning Can Help Make Recycling Less Expensive for Local Governments; NIST website; byBradley Sutliff; May 15, 2024; printed from the Internet on Mar. 11, 2025; 9 pages.*

(Continued)

*Primary Examiner* — Ronald D Hartman, Jr.
(74) *Attorney, Agent, or Firm* — Fish & Richardson P.C.

(57) ABSTRACT

A machine-learning based approach to preemptively adjust additives applied to a stream of plastic to obtain recycled plastic with desired target characteristics. The approach includes obtaining sensor input of an input stream of material into a plastic recycling system and determining, using a machine-learning model, a target set of characteristics of an output material. The machine-learning model is trained to determine an administration scheme associated with a set of additives to be added to the input stream to obtain the target set of characteristics that include at least one of a (i) physical characteristic or (ii) a mechanical characteristic, of the output material. The approach includes generating a control signal configured to affect a control system for adjusting the set of additives within the plastic recycling system in accordance with the administration scheme.

19 Claims, 4 Drawing Sheets

(56) References Cited

FOREIGN PATENT DOCUMENTS

WO    WO-2025016927 A1 *  1/2025  ............. B07C 5/342

OTHER PUBLICATIONS

How AI is Helping Improve Plastic Recycling Efficiency; Recycling Today; 5 pages; printed from the Internet on Mar. 10, 2025.*
specim.com [online], "Specim FX50 hyperspectral camera—a breakthrough in black plastic sorting," Sep. 26, 2019, retrieved on Mar. 11, 2025, retrieved from URL <https://www.specim.com/breakthrough-in-black-plastic-sorting/>, 7 pages.
Sutliff et al., "Correlating Near-Infrared Spectra to Bulk Properties in Polyolefins," Macromolecules, Feb. 28, 2024, 57(5): 2329-2338.

* cited by examiner

MACHINE-LEARNING BASED MONITORING OF PLASTIC RECYCLING

TECHNICAL FIELD

This specification generally relates to monitoring plastic recycling systems.

BACKGROUND

Plastic recycling involves collecting and processing plastic waste to create reusable materials. Plastic recycling can include a number of processes to prepare plastic waste for melting and reforming, e.g., into pellets to form new plastic products, as well as manufacturing new products. Effective plastic recycling reduces environmental pollution and conserves natural resources by decreasing the need for virgin plastic production.

SUMMARY

In general, innovative aspects of the subject matter described in this specification relate to a machine-learning based approach for preemptive adjustments of additives applied to an input stream of plastic material (e.g., granules, flakes, pellets, whole pieces of plastic, plastic product) processed by a plastic recycling plant to obtain recycled plastic with particular target characteristics. A plastic recycling plant collects and applies various processes to input streams to recycle plastic that can be used for manufacturing new plastic products. These processes can include washing, shredding, separating, extruding, and compounding plastic material found in the input streams. The plastic material in the input streams can come from various sources and have varying physical and mechanical properties. Additives (e.g., dyes, compatibilizers, other chemicals etc.) can be added to the input streams to achieve target characteristics (e.g., color, mechanical strength etc.) of the plastic in the output streams.

Identifying an appropriate quantity and timing of administration of additives to achieve the target characteristics can be challenging, particularly because the composition of the input streams can vary over time. Some existing processes adjust the administration schemes based on a feedback loop by monitoring characteristics of the output stream, and reactively making the adjustments. However, in some cases, the composition of the input stream may change by the time the feedback-based adjustments are made-rendering the adjustments inadequate to achieve the target characteristics in the corresponding portions of the output stream.

This specification describes a feedforward mechanism-based approach that monitors characteristics of plastic materials in portions of the input stream before the portions enter the recycling process, and proactively determine an administration scheme to apply additives to achieve the target characteristics for the corresponding output. In some implementations, a machine learning model is trained to determine an administration scheme for additives (e.g., a control scheme for dispensing particular amounts of additives at particular times and/or stages within the recycling process) to convert a portion of the input stream with particular physical and mechanical characteristics into recycled plastic with the target characteristics.

By proactively determining administration schemes for the additives, the feedforward approach described herein can improve efficiency of recycling processes as compared to feedback-based systems, for example, by reducing wastage of recycled plastic that fails to achieve the target characteristics. The feedforward mechanism can allow for a plastic recycling plant to obtain a plastic output with fewer compounding cycles by proactively determining administration schemes for additives. This in turn can result in fewer processing cycles performed by a plastic recycling plant (as compared to that in a feedback-based system), and by extension, consumption of less resources by machinery (e.g., extruders, other types of recycling equipment) and reduced carbon emissions. Proactively determining and applying administration schemes for the additives can also improve homogeneity of recycled output material (e.g., plastic material), thereby mitigating downstream effects of plastic recycling that would otherwise degrade the quality of output plastic material. Increasing the homogeneity of output plastic material also increases the amount of usable plastic (e.g., a higher percentage of plastic with the target quality) in the output recycled plastic material. In some cases, by applying a precise amount of the appropriate additives at a precise time that is the most efficient for achieving the target characteristics for output plastic material, the technology described herein may also prevent (or substantially minimize) extraneous consumption of the additives.

In one aspect, the subject matter described in this specification can be embodied in a method for additive adjustments in a plastic recycling system, the method including the actions of obtaining sensor input indicative of one or more characteristics of an input stream of material into the plastic recycling system, and determining, based on the sensor input using a machine-learning model, a target set of characteristics of an output material of the plastic recycling system. The machine-learning model is trained to determine an administration scheme associated with a set of additives to be added to the input stream of material within the plastic recycling system to obtain the target set of characteristics of the output material. The target set of characteristics include at least one of a (i) physical characteristic or (ii) a mechanical characteristic of the output material, and generating a control signal configured to affect a control system for adjusting the set of additives within the plastic recycling system in accordance with the administration scheme.

The foregoing and other embodiments can each optionally include one or more of the following features, alone or in combination.

In some implementations, the sensor input includes sensor measurements captured by one or more of (i) an optical sensor, (ii) a laser spectrometer, (iii) an infrared sensor, (iv) a capacitor sensor, or (v) an in-line optical fiber.

In some implementations, the administration scheme includes, for each additive in the set of additives, at least one of a corresponding administration time or a dosage, each administration time corresponding to each administration dosage. The administration time indicates a time to apply the administration dosage to the input stream of material. The administration dosage indicates an amount of additive to apply to input stream of material.

In some implementations, the set of additives includes at least one of (i) dyes/colorants, (ii) masterbatch, (iii) compatibilizers, (iv) fillers/reinforcements, (v) stabilizers, or (vi) modifiers.

In some implementations, the physical characteristic includes at least one of (i) color, (ii) conductivity, (iii) density, (iv) size, (v) shape, or (vi) volume, of the output material.

In some implementations, the mechanical characteristic includes at least one of (i) strength, (ii) stiffness, (iii) hardness, or (iv) toughness, of the output material.

In some implementations, the method includes providing the control signal to the control system of the plastic recycling system and adjusting the set of additives of the plastic recycling system to follow the administration scheme. Following the administration scheme includes applying the set of additives to the input stream of material.

In some implementations, the one or more characteristics of the input stream of material includes at least one of (i) a color composition, or (ii) a polymer composition of plastic in the input stream of material.

In some implementations, the machine learning model is trained by a training of stream of material, the training stream of material including a tracer identifying plastic from the training stream of materials. The training of the machine learning model includes providing sensor input indicative of a first set of characteristics of the training stream of material to the machine learning model, providing a target set of characteristics of an output training stream of material of the plastic recycling system to the machine learning model. The training of the machine learning model includes determining, by the machine learning model, a training administration scheme associated with a set of additives to be added to the training stream of material within the plastic recycling system to obtain the target set of characteristics of the output training stream of material. The training of the machine learning model includes applying the set of additives to the training stream of material to obtain the output training stream of material and obtaining additional sensor input indicative of an output set of characteristics of the output training stream of material. The training of the machine learning model includes comparing the output set of characteristics of the output training stream of material to the target set of characteristics of the output training stream of material and based on the comparison of the output set of characteristics to the target set of characteristics, updating one or more parameters of the machine learning model.

Other implementations of this and other aspects include corresponding systems, apparatus, and computer programs, configured to perform the actions of the methods, encoded on computer storage devices. A system of one or more computers can be so configured by software, firmware, hardware, or a combination of them installed on the system that in operation cause the system to perform the actions. One or more computer programs can be so configured by instructions that, when executed by data processing apparatus, cause the apparatus to perform the actions.

In another aspect, a plastic recycling system includes one or more sensors configured to obtain one or more characteristics of an input stream of material into the plastic recycling system. The plastic recycling system includes a computing device that includes a machine learning model configured to determine a target set of characteristics of an output material of the plastic recycling system and a control system configured to apply a set of additives to the input stream of material based on a control signal. The machine-learning model is trained to determine an administration scheme associated with the set of additives to be added to the input stream of material by the one or more plant devices to obtain the target set of characteristics of the output material. The target set of characteristics include at least one of a (i) physical characteristic or (ii) a mechanical characteristic of the output material. The machine learning model is configured to generate the control signal to affect the set of additives within the plastic recycling system in accordance with the administration scheme.

In another aspect, a non-transitory computer-readable storage medium storing instructions that when executed by one or more processors cause the one or more processors to perform various operations. The operations include obtaining sensor input indicative of one or more characteristics of an input stream of material into the plastic recycling system, determining, based on the sensor input using a machine-learning model, a target set of characteristics of an output material of the plastic recycling system. The machine-learning model is trained to determine an administration scheme associated with a set of additives to be added to the input stream of material within the plastic recycling system to obtain the target set of characteristics of the output material. The target set of characteristics include at least one of a (i) physical characteristic or (ii) a mechanical characteristic of the output material. The operations include generating a control signal configured to affect a control system for adjusting the set of additives within the plastic recycling system in accordance with the administration scheme.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
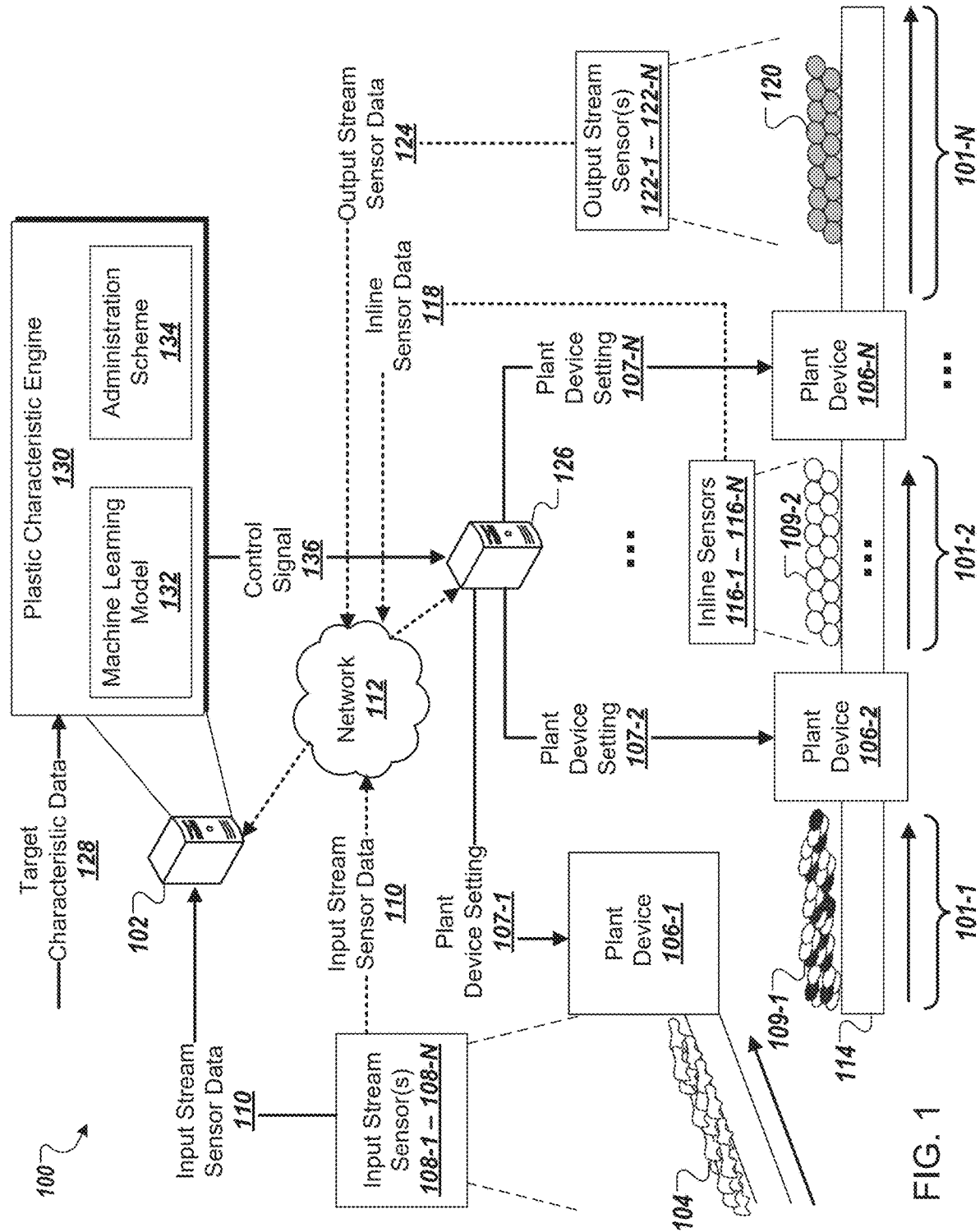
FIG. 1 is a diagram showing an example of machine learning-based monitoring of plastic in a plastic recycling system.

To manufacture plastic products, the plastic pellets used to form the product are treated with additives, e.g., chemicals, to achieve target characteristics for properties such as color, rigidity, durability, melt flow, density, compression strength, impact resistance, etc. Virgin plastic resin with these target characteristics can be used to manufacture plastic products. To reduce the amount of wasted plastic and plastic pollution, plastic from plastic products can be recycled. An example process for recycling plastic can include cleaning the plastic, chopping the plastic into flakes, melting the flakes into a liquid form, adding dyes to recolor the plastic, filtering contaminants, and adding additives to alter chemical and/or physical properties of the plastic. The processed recycled plastic can be extruded into pellets, which can then be used to generate (e.g., manufacture) new plastic products from recycled plastic material.

However, recycled plastic pellets (and other types of recycled resin) that are formed through extrusion are often compounded multiple times to achieve similar quality to virgin pellets, resulting in high resource usage. In some cases, the variability of plastic characteristics between operation cycles of a plastic recycling system can result in output plastic material that does not meet the target characteristics, in turn demanding additional processing to obtain the target characteristics. Polymer chains in the plastic material can degrade during plastic recycling processes, due to the different types of processes that affect the temperatures and characteristics of plastic material. Processing streams of plastic material can result in a series of measurements (referred to as "a melt history") that render the plastic to be less likely to obtain the target characteristics. This in turn can result in additional consumption of additives and additional recycling processes that could otherwise be avoided if an initial plastic recycling process is tuned to the parameters, resulting in the target characteristics. In some cases, an input stream of plastic material may not be amenable to be recycled into an output stream with the target characteristics, but this may not be discovered until after the compounding and extrusion processes. This in turn can result in wasted plastic material and consumption of resources, e.g., computing resources, additive materials, electrical power, etc. In some cases, this can result in extraneous carbon emissions resulting from the additional plastic processing.

The disclosed technology describes a feedforward mechanism-based approach that monitors plastic material characteristics prior to and throughout processing of the plastic material allows for a proactive determination of an administration scheme to apply additives to achieve the target characteristics. By allowing for pre-emptive adjustment of process parameters and additives, the technology described herein can allow for implementing efficient plastic recycling plants that produce recycled plastic with accurate target characteristics. Using one or more machine learning models to preemptively control process parameters and additives, and allowing feedback-based retraining of the models can allow for more accurate results (e.g., recycled plastic pellets with a high degree of fidelity to the target characteristics) as compared to systems that rely on feedback-based control of recycling systems. This in turn can also reduce the amount of extraneous additives that are applied in plastic recycling processes, and provide a substantial reduction in cost for plastic recycling, e.g., environmental cost and/or economic cost resulting from the reduced additive usage/waste. For example, additives can have a particular cost (e.g., tens of thousands of dollars per ton) to achieve a consistent dosage ratio (e.g., ~3%). The disclosed technology can provide a real-time adjustment of additives (e.g., up to 3%) to reduce additive usages while obtaining target characteristics for plastic material, thereby saving on economic cost (e.g., hundreds of dollars per ton) and increasing the feasibility of plastic recycling.

FIG. 1 is a diagram showing an example of machine learning-based monitoring of plastic in a plastic recycling system 100, also referred to as "system 100." The system 100 receives an input stream 104 of plastic material and processes the input stream 104 over multiple stages 101-1 through 101-N (collectively referred to as "stages 101") of plastic processing to generate an output stream 120 of plastic material. A stage of the plastic recycling process performed by the system 100 can include various types of plastic processing, such as collecting, sorting, cleaning, shredding, melting, extruding, among others. Examples of input stream 104 can include a stream of plastic material, which can include plastic in the form of pellets, flakes, granules, whole pieces of plastics (e.g., bottles, injection pieces, film, plastic product), etc.

The system 100 includes plastic recycling plant devices 106-1 through 106-N (collectively referred to as "plastic recycling plant devices 106" or "plant devices 106") that can be configured to operate at one of the stages 101. Although FIG. 1 illustrates each stage (e.g., stage 101-1) having a single plant device (e.g., plant device 106-1), a stage can include multiple plant devices. Examples of plant devices 106 can include shredders (e.g., device configured to cut plastic into smaller pieces of plastic), granulators (e.g., device configured to cut small pieces of plastic into granules, flakes), extruders (e.g., device configured to melt and form plastic into pellets, or sheets), sorters (e.g., optical sorters configured to sort plastic into different categories such as type, shape, color) and balers (e.g., compress plastic materials to take up less space), among other types of equipment for plastic processing.

The plant devices 106 are configured to process streams of plastic material as the streams move throughout the plastic recycling system 100. For example, the input stream 104 can be provided to the plant device 106-1 (e.g., by a conveyer belt or any appropriate mechanism) and the plant device 106-1 can be configured to perform a number of processes, e.g., shredding plastic material, applying additives, to the input stream 104 to output an intermediate stream 109-1 of plastic material. The intermediate stream 109-1 can be provided for input to the subsequent plant device 106-2 of the system 100. The plant device 106-2 is configured to process the intermediate stream 109-1 as an input, and to generate intermediate stream 109-2 as an input. A number of plant devices can be used to generate a number of intermediate streams of plastic material, each intermediate stream of plastic material being a processing output of a plant device.

As an example, the plant device 106-1 can include a sorter to sort the plastic material in the input stream 104 (e.g., by color, size) to output the intermediate stream 109-1 of sorted plastic material. The plant device 106-2 can be a shredder to shred the sorted plastic material in the intermediate stream 109-1 to generate the intermediate stream 109-2 of shredded plastic material for the next plant device, e.g., plant device 106-3 to process. Other processes can include melting and extruding plastic material in streams of plastic, through plant devices configured to melt plastic (e.g., by applying heat and/or pressure) such as extruders, injection molding machines, blow molding machines, and rotary kilns, among others. A second to last plant device, e.g., the plant device preceding plant device 106-N, can be configured to output a penultimate plastic stream (e.g., the last intermediate stream 109-N) and provide the penultimate plastic stream to the last plant device 106-N in the system 100, which can be configured to generate the output stream 120. As an example, the last plant device 106-N can be an extruder configured to melt plastic material in the penultimate plastic stream to generate an output stream 120 made up of recycled plastic pellets. In some cases, recycled plastic material in the output stream 120 can also include sheets, fibers, and other forms of recycled plastic material, e.g., of various shapes and sizes.

In some implementations, the system 100 includes a set of input streams sensors 108-1 through 108-N (collectively "input sensors 108") configured to capture sensor data (e.g., measurements) associated with the input stream 104 and provide the sensor data to the one or more computing devices 102 as input stream sensor data 110. In some implementations, the system 100 includes a set of inline sensors 116-1 through 116-N (collectively "inline sensors 116") configured to capture sensor measurements associated with intermediate streams of plastic (109-2, for example). In some implementations, the system 100 includes a set of output stream sensors 122-1 through 122-N (collectively "output sensors 122") configured to capture sensor measurements of the output stream 120. Examples of sensors can include cameras, optical sensors, laser spectrometers, infrared sensors, capacitor sensors, in-line optical fibers, among other types of sensors. Sensors of the system 100 can be configured to capture measurements relating to characteristics (e.g., temperature, physical, mechanical, electrical) of plastic material.

The sensor locations shown in FIG. 1 are for illustrative purposes, and other locations for the sensors are within the scope of the disclosure herein. For example, although FIG. 1 does not illustrate sensors between plant devices 106-1 and 106-2 (e.g., to capture sensor measurements associated with the output stream of plant device 106-1, or the input stream of plant device 106-2), one or more sensors can be positioned between the output of plant device 106-1 and the input of plant device 106-N. In general, sensors may be placed at various locations within the system 100 depending on opportunities to collect relevant data that may be used to adjust parameters of the process being executed by the system 100.

The system 100 can include a conveyor system 114, which can include plant equipment and devices to transport (e.g., belt conveyors, roller conveyors, chain conveyors,) streams of plastic material from one stage to another stage. In some implementations, the conveyor system 114 can include sensors to capture measurements relating to the conveyors and/or the materials being transported by the conveyors. For example, the conveyor system 114 can include encoders (e.g., rotary encoders, linear encoders, incremental encoders, absolute encoders) to measure speed, position, direction, visual characteristics, and other characteristics for controlling transport of plastic material from one processing stage to another processing stage. For example, the conveyor system 114 can include optical position tracking sensors or other types of vision-based position tracking of plastic material across different processing stages.

In some implementations, the system 100 includes sensors at the input stage 101-1 (e.g., input stream sensors 108), at the intermediate processing stage 101-2 through 102-N–1 (e.g., inline sensors 116), and at the output stage 101-N (e.g., output sensors 122) to provide sensors measurements throughout the plastic recycling process. In this way, the system 100 can monitor characteristics of the plastic material while the plastic is being processed and provide a feedback mechanism to the computing device 102. The feedback mechanism allows for sensor data to be provided to the computing device 102, which can implement a plastic characteristic engine 130 configured to generate an administration scheme 134 and/or control signals 136 to adjust operation of the system 100.

The plastic characteristic engine 130 (also referred to as "engine 130") includes a machine learning model 132 configured to process inputs of the system 100 and generate the administrative scheme 134 and/or the control signals 136. The inputs of the machine learning model 132 (also referred to as "model 132") can include a set of target characteristic data 128, as well as sensor inputs from the sensors of the system 100, e.g., input stream sensor data 110 from input sensors 108, inline sensor data 118 from inline sensors 116, and/or output stream sensor data 124 from output sensors 122. Sensor data can be provided to the engine 130, by the computing device 102 being communicatively coupled to other components of the system 100 through a communication network 112 (also referred to as "network 112").

Components of the system 100 can be communicatively coupled to one another through the network 112, e.g., a communication network, to facilitate electronic communication between the components. For example, the network 112 can include one or more networks or subnetworks, each of which may include a wired or wireless data pathway. Network 112 may, for example, include one or more of the Internet, Wide Area Networks (WANs), Local Area Networks (LANs), or other packet-switched or circuit-switched data networks that are capable of carrying electronic communications (e.g., data or voice communications).

Referring to the engine 130, the machine learning model 132 is configured to predict, based on the inputs, an administration scheme 134 that provides target dosages of additives to the plastic material. For example, the administration scheme 134 can include amounts of additives and dosage timing of when to add the amount of additive, for one or more plant devices from the plant devices 106. The machine learning model 132 can be configured to determine control signals 136 to adjust operation of the plant devices 106, e.g., to apply the amount of additive indicated by the dosage at the dosage timing. The computing device 102 is configured to provide the control signals 136 to a control unit 126, e.g., by network 112.

The machine learning model 132 can be configured to predict parameters related to the plastic material. For example, parameters of the plastic material can include color, polymer type, polymer melt flow index, intrinsic viscosity, molecular weight, stability, a type of degradation (e.g., hydrolytic degradation, oxidative degradation) and degree of degradation (e.g., an amount antioxidant content indicative of oxidative degradation). an amount of antioxidant, moisture, recycled content, additives, contaminants, etc. The model 132 can be configured to predict parameters of the plastic material that relate to the physical structure of plastic, such as cross-linking of bonds within the plastic material or the type of polymer, e.g., homopolymer, copolymer. In some cases, a parameter can be an indicator for an amount of additive incorporated into the plastic material. For example, a polymer type can indicate an amount of compatibilizer added to the plastic material.

In some cases, the control signals 136 can include high-level instructions (e.g., target output parameters of the plant device) that the control unit 126 can use to generate low-level commands (e.g., input commands to configure the plant device to output the target parameters), through plant device settings 107-1 through 107-N, to the corresponding plant devices. As an example, a high-level instruction can indicate an output parameter for the plant device to be adjusted to, by adjusting a plant device setting from a first output parameter to a target output parameter of the plant device. Examples of parameters can include temperature, pressure, speed, air pressure, throughput, belt speed, time/duration, cycle time, rotor speed, blade gap, clamping force, scan speed, among others. Low-level control for the plant device can include low-level commands that control the plant device and result in the corresponding output high-level instruction to generate a target output parameter.

The control unit 126 can receive a control signal 136 indicating an adjustment in the operation of plant device 106-2 to adjust the amount of additive and/or the timing of applying the additive to the intermediate stream 109-1. The control unit 126 can determine to the plant device setting 106-2 that results in the plant device 106-2 applying the adjusted amount of additive and/or applying the additive the timing from the control signal 136. In some implementations, the control signal 136 can include low-level commands that can be directly provided to the plant device, e.g., by wireless communication, and/or transmitted to the plant device by the control unit 126 without the control unit 125 having to process the control signal into low-level commands for the plant device to follow.

The administration scheme 134 and/or the control signals 136 can be referred to as a control strategy that allows the system 100 to use sensor data to adjust operation of plant devices 106 in the system 100, thereby increasing the likelihood of the output material 120 having the target characteristic data 128. In this way, the engine 130 can provide a feedforward mechanism for the system 100 using sensor data input. For example, sensor data from input sensors 108 and/or inline sensors 116 (among other sensors that may be implemented throughout the stages 101 of plastic recycling processes), can be used to adjust control parameters for the plant devices 106 as a stream of plastic material is processed by the system 100. The model 132 can determine (e.g., by predicting and/or identifying) target parameters of the plant devices 106 to achieve the target characteristics. The control strategy performed through administration scheme 134 and/or the control signals 136 can allow for the system 100 to pre-emptively adjust plant devices 106 (e.g., through plant device settings 107) to achieve the target characteristics as the input stream is processed by different plant devices.

For example, an input stream of plastic material can be processed through multiple stages to obtain an output stream of plastic material with target characteristics, e.g., purity, color, thermal stability, rigidity, homogeneity, consistency, density, melt flow index, etc., among other types of chemical, mechanical, electrical, thermal, environmental, and physical properties. The model 132 can use sensor measurements of the plastic material prior to and while plastic processes are being applied to the plastic material to determine (e.g., continually, periodically) plastic characteristics. By monitoring the plastic characteristics before, during, and/or after the plastic processing, the model 132 can identify potential instances of the plastic material's characteristics deviating from the target characteristics and pre-emptively provide adjustments to prevent deviations, thereby allowing the system 100 to achieve the target characteristics for the output plastic material. In this way, the sensor measurements (e.g., input sensor data, in-line sensor data) can be used by the model 132 to generate control parameters downstream for the plant devices 106. Further, the sensor measurements (e.g., output sensor data) can be used by the engine 130 to re-train the model 132 and identify improvements in plastic recycling processes. In some cases, the feedforward mechanism to apply adjustments to streams of plastic material can be simultaneously performed with the feedback mechanism for training the model.

In some implementations, any of the sensors 108, 116, and 122 can include a sensor array such as an array of cameras. Each camera in the sensor array can be configured to capture images of streams of plastic material for at different wavelengths, e.g., Ultraviolet (UV), UV-Visible, Near-Visible Infrared (NVIR), Short-Wave Infrared (SWIR), Medium-Wave Infrared (MWIR), Long-Wave Infrared (LWIR). In this way, the engine 130 can be configured to perform sensor fusion and generate a multi-spectral image of the plastic material. For example, the model 132 can combine sensor measurements from multiple sensors that each capture sensor measurements at a particular portion of the frequency spectrum. Sensor fusion may be preferred in examples where a portion of a plastic material's spectral fingerprint cannot be detected or has low detectability by a first type of sensor, e.g., configured to capture measurements in a first range of frequencies. The plastic material may be detectable or improved detectability by a second type of sensor, e.g., configured to capture measurements in a second range of frequencies. The model 132 can combine sensor measurements from different portions of the frequency spectrum to determine a spectral fingerprint of plastic material. For example, the model 132 can process sensor measurements from an NIR sensor, a UV sensor, a SWIR sensor, and/or a MIR sensor to generate a spectral fingerprint for the plastic material.

The model 132 can be configured to determine a spectral fingerprint of the plastic material based on the multi-spectral spectral image and predict an administration scheme to achieve target output characteristics based on the multi-spectral spectral image. In some implementations, the engine 130 can be configured to compensate for low sensitivity of a particular sensor or sensor in a first wavelength by using measurements from another sensor or sensors having a higher sensitivity at the same first wavelength. For example, a silicon detector can have low sensitivity at NIR wavelengths (e.g., 950-1700 nm range) resulting in poor quality measurements. Thus, a second sensor in the array with higher sensitivity at NIR wavelengths, such as Indium Gallium Arsenide (InGaAs) cameras, can be used to capture images at a higher quality in the same wavelength range. In some implementations, a sensor can be a quantum dot sensor to capture information, e.g., optical measurements, of plastic material in the streams processed by the system 100, e.g., to generate input images or signals for prediction by the engine 130.

In some implementations, the engine 130 can be configured to generate training examples of administration schemes corresponding to spectral fingerprints between input streams of plastic material and output streams of plastic material. In some implementations, the model 132 can be configured to apply chemometrics to determine chemical characteristics of streams of plastic material to improve model accuracy in determining administration schemes that achieve target output characteristics.

In some implementations, a sensor from any of the input sensors 108, inline sensors 116, and output sensors 122, can include one or more processors for processing sensor measurements. In this way, the system 100 can allow computing at the sensor, e.g., performing edge computing, rather than the engine 130 of the computing device 102 processing sensor measurements. The engine 130 can be configured to selectively invoke edge computing for a sensor to process (e.g., filter) sensor measurements. Examples of processors can include graphical processing units, computer processing units, application specific integrated circuits, etc. In some implementations, sensors of the system 100 can include cooling subsystems. In some implementations, sensors of the system 100 can include pyroelectric detectors (e.g., in addition to FTIR techniques), indium antimonide (InSb) detectors, and thermopile detectors (e.g., non-dispersive infrared techniques) to detect differences between plastic materials with particular characteristics, such as thermoplastics, e.g., high-density polyethylene (HDPE) and polypropylene (PP). For example, pyroelectric and thermopile detectors may be coupled to the sensors to allow the engine 130 to distinguish types of plastic that may share a visual characteristic (e.g., same color) but differ in other properties, e.g., other physical characteristics, mechanical characteristics, thermal characteristics. As another example, InSb detectors configured for photonic detection (e.g., infrared data) can be coupled to the sensors to allow the engine 130 to distinguish types of plastic that may share photoelectric properties.

In some implementations, the machine learning model 132 includes one or more fully or partially connected layers. Each of the layers can include one or more parameter values indicating an output of the layers. The layers of the machine learning model 132 can be configured to generate administration schemes for target characteristics of the output plastic material, which can be used to perform one or more control actions in the plastic recycling system 100. The control actions, e.g., through control signals 136, can include adjusting dosages of additives, e.g., dyes, colorants, masterbatch, compatibilizers, fillers, stabilizers, modifiers, and/or reinforcements. In some implementations, the control actions can include adjusting device configurations and/or controls of the plant devices to adjust operation to achieve the target dosages.

In some implementations, the machine learning model 132 includes one or more input layers, one or more hidden layers, and an output layer configured to generate a prediction based on input provided by previous layers, e.g., the input layers, hidden layers. For example, the machine learning model 132 can include an input layer for receiving sensor data (e.g., input stream sensor data 110, inline sensor data 118, output stream sensor data 124). The machine learning model 132 can output an administration scheme 134, a control signal 136, or some combination thereof, corresponding to target characteristic data 128 for a stream of plastic material based on the sensor data, e.g., sensor data 110, 118, and 124.

In some implementations, the model 132 can include feed-forward neural networks with multiple feed-forward layers. Each feed-forward neural network can include multiple fully-connected layers, in which each fully-connected layer applies an affine transformation to the input to the layer, i.e., multiplies an input vector to the layer by a weight matrix of the layer. Optionally, one or more of the fully-connected layers can apply a non-linear activation function e.g., ReLU, logistic, hyperbolic tangent, to the output of the affine transformation to generate the output of the layer. In some implementations, the model 132 can be configured to apply regression techniques, e.g., linear, logistic, polynomial, RIDGE regression, LASSO techniques, partial least squares (PLS).

In some implementations, the computing device 102 performs one or more operations described as performed by the engine 130. In some implementations, the computing device 102 provides data to one or more other processing components to perform operations described as performed by the engine 130.

Figure 2:
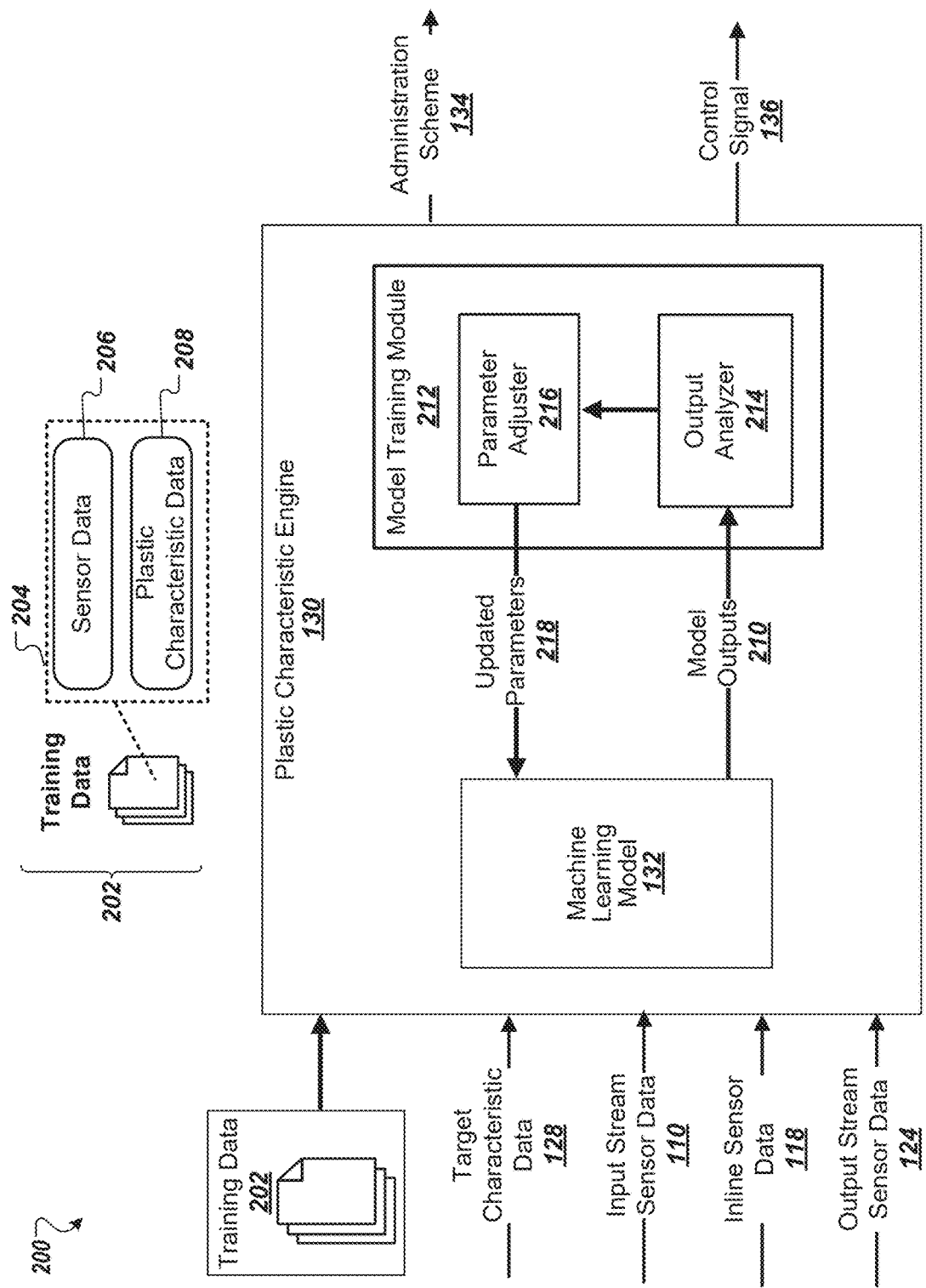
FIG. 2 is a block diagram showing an example of a system supporting a machine learning model used in conjunction with a plastic recycling system.

FIG. 2 is a block diagram showing an example of a system supporting a machine learning model used in conjunction with a plastic recycling system. FIG. 2 shows an example environment 200 for training the model 132 described in reference to FIG. 1 above. The environment 200 shows the engine 130 to train the model 132 to generate outputs including administration scheme 134 and/or control signals 136 for a recycling plant, e.g., system 100. The environment 200 shows training data 202, which includes at least a training example 204 that pairs a set of sensor data 206 to a set of plastic characteristic data 208, e.g., an example of a ground truth measurement.

The engine 130 provides training examples, e.g., training example 204, target characteristic data 128, sensor data (e.g., input stream sensor data 110, inline stream sensor data 118, output stream sensor data), or some combination thereof, to the model 132 to generate a model output, e.g., the administration scheme 134 and/or the control signal 136. The administration scheme 134 can include an administration time indicating a time to apply a dosage of an additive to a stream of plastic material, and an administration dosage indicating an amount of additive to apply at the administration time.

The engine 130 provides input data (e.g., target characteristic data 128, sensor data 110, 118, 124) to the machine learning model 132 to generate a model output(s) 210. In some implementations, the engine 130 can be a server, or a server farm e.g., a cluster of multiple computing devices, to train the model 132. In some implementations, the engine 130 can include multiple server farms configured to train the model 132.

The model output 210 is provided to a model training module 212, which can include a submodule for output analysis, illustrated as output analyzer 214 and a submodule to adjust model parameters, illustrated as parameter adjuster 216. The model training module 212 includes a feedback mechanism to the model 132. The model training module 212 is configured to perform a number of training updates based on different training examples provided e.g., training example 204. The model training module 212 can perform many iterations e.g., millions, of training to gradually and incrementally learn how to make more accurate administration schemes for improving output quality, e.g., achieving the target characteristics of output plastic streams. Through the collection of training data 202 from various plastic recycling systems and plants, the engine 130 can improve the accuracy of the model 132 over time, learning to identify effective administration schemes and/or control signals, for a new plastic recycling system/plant, different types of plastics, different regions that may have some association with certain target characteristics, and/or different output products that correspond to different target characteristics.

The model training module 212 then uses the model output 210 for the current training example 204, the sensor data 206 and the plastic characteristics data 208, for the current training example to determine how to adjust the parameters of the model 132. For example, the output analyzer 214 can identify a predicted administration scheme for the corresponding plastic plant, sensor data and compare with the plastic characteristic data 208 for the sensor data 206. If the predicted administration scheme, e.g., the model output 210, includes dosages and/or timing for dosages that are not within in a threshold value, the output analyzer 214 can identify features of the sensor data for the training example 204 and the model 132 can be adjusted.

The model 132 can adjust parameters through the parameter adjuster 216 to increase the accuracy of the model output 210 to match the plastic characteristic data 208 within the threshold. In some implementations, the output analyzer 214 can calculate an error measure or a value of an objective function to quantify the error represented by the difference between the model output 210 and plastic characteristic data 208. The results of the analysis are provided to the parameter adjuster 216 that alters the values of parameters in the model 132. For example, in a neural network, the parameter adjuster 216 can adjust the values of weights and biases for nodes in the neural network.

In some implementations, the parameter adjuster 216 can adjust model parameters that include a penalty parameter. In some implementations, parameters adjusted in by the parameter adjuster 216 can be learned e.g., by a neural network that can include the model 132. In some implementations, the updated parameters 218 can include coefficients or weights of a neural network, biases of a neural network, and cluster centroids in clustering networks. In some implementations, hyperparameters e.g., parameters to adjust learning of the model 132, can be adjusted for training the model 132. Hyperparameters may include a test-train split ratio, learning rates, selection of optimization algorithms, selection of functions e.g., activation, cost, or loss functions, a number of hidden layers, a dropout rate, a number of iterations, a number of clusters, a pooling size, a batch size, and a kernel or filter size in convolutional layers.

The output analyzer 214 and the parameter adjuster 216 can operate together to train, e.g., by the model training modules 212, the model 132 using any appropriate algorithm such as backpropagation of error or stochastic gradient descent. Through many different training iterations, based on various different training examples 204 in the training data 202, the model 132 learns to accurately predict administration schemes based on sensor data 206 of the plastic recycling plant. The model 132 can be trained on time-series data streams of sensor measurements and images over a time period e.g., hours, days, weeks, and so on. The model 132 is evaluated for error and accuracy over a validation set. The model training continues until either a timeout occurs (e.g., typically several hours) or a predetermined error or accuracy threshold is reached.

In some implementations, an ensemble of models may be implemented to improve overall accuracy of administration schemes corresponding to desired plastic characteristic data. Model training and re-training of the model 132 can be performed repeatedly at a pre-configured cadence e.g., once a week, once a month, and if new data is available, it can be included as part of the training. The data pipeline to obtain new data remains the same as described above.

The model training module 212 of the engine 130 can perform a variety of training techniques to train the machine learning model 132 and improve accuracy of administration schemes that correspond to the target characteristics for the output plastic material, including supervised and unsupervised learning. In some examples, the model training module 212 performs hybrid-learning techniques to train the machine learning model 132 to improve the likelihood of the administration scheme achieving the target characteristics for the output plastic material. The training of the machine learning model 132 can be performed using obtained ground truth data that includes known characteristics of output plastic material and streams of sensor data, e.g., inline sensor data, input sensor data. The model training module 212 can adjust one or more weights and/or parameters, e.g., through updated parameters 218, of the machine learning model 132 to match estimates or predictions from the machine learning model 132 to the ground truth data.

In some implementations, the model training module 212 adjusts one or more weights or parameters of the differentiable layers in the machine learning model 132. In some implementations, parameters of the machine learning model 132 are randomly initialized. In some implementations, the machine learning model 132 is adjusted using various optimization techniques applied by the model training module 212.

Figure 3:
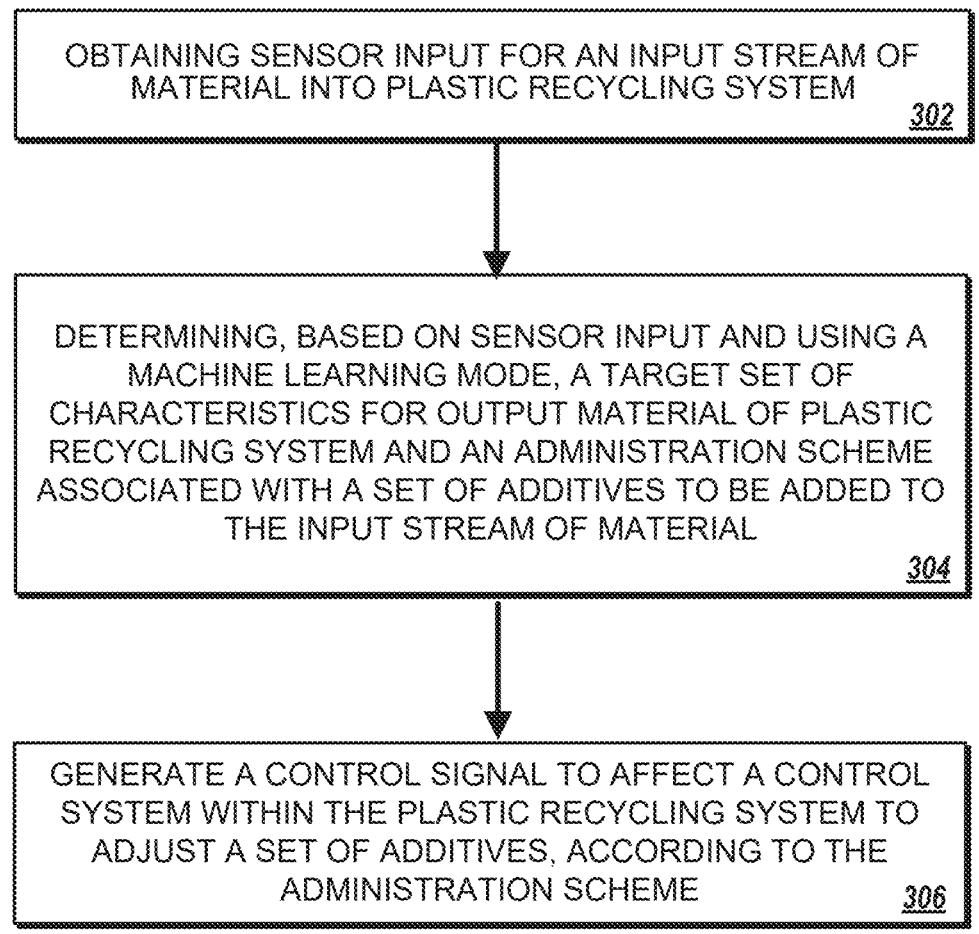
FIG. 3 is a flow diagram showing an example of a process involving a machine learning model used in conjunction with a plastic recycling system.

FIG. 3 is a flow diagram showing an example of a process 300 involving a machine learning model used in conjunction with a plastic recycling system. The process 300 can be performed by the computing device 102 of the plastic recycling system 100. The process 300 can be performed by portions of the system depicted in FIGS. 1 and 2, including, for example, one or more computing devices 102, coupled with a control unit 126 configured to provide controls/settings to plant devices 106. Steps of the process 300 can be performed by leveraging the machine learning model 132, which can be stored on the one or more computing devices 102, the control unit 126, or one or more remote devices communicatively coupled to the computing device 102 and/or the control unit 126, or some combination thereof.

Operations of the process 300 includes obtaining sensor input indicative of one or more characteristics of an input stream of material into the plastic recycling system (302). Examples of the one or more characteristics of the input stream of material can include at least one of (i) a color composition, or (ii) a polymer composition, of plastic in the input stream of material. Although polymer composition can include a type of polymer or a combination of types of polymers, a polymer composition can also be a signature fingerprint of the plastic material. The fingerprint can indicate information about the additives, contaminants, and other characteristics to uniquely identify the plastic material in a stream of plastic.

The sensor input (e.g., input stream sensor data 110) can include sensor data (e.g., measurements) of the input stream of material captured by input stream sensors, e.g., input stream sensors 108. The sensor input (e.g., input stream sensor data 118) can also include in-line sensor data (e.g., measurements) captured by an in-line sensor (e.g., inline sensor 116) during any one of the recycling processes performed by the plastic recycling system, e.g., stage 101-1 through stage 101-N. Examples of sensors can include cameras configured to capture images and/or videos, optical sensors, e.g., detect light properties reflected or refracted from the plastic material. Referring to optical sensors, a sensor can capture measurements of a stream of plastic material at any wavelength and/or a range of wavelengths. In some cases, an in-line sensor can include rheometer configured to perform in-line detection of melt flow for plastic material and/or provide sensor measurements of intrinsic viscosity of the plastic material, e.g., in a molten state.

In some implementations, the sensor input includes sensor measurements captured by one or more of (i) an optical sensor, (ii) a laser spectrometer, (iii) an infrared sensor, (iv) a capacitor sensor, or (v) an in-line optical fiber. Sensor input can be captured by sensors of the plastic recycling system, e.g., plastic recycling system 100 described in reference to FIG. 1 above. Other examples of in-line sensors can include devices configured to perform capillary rheometry, online viscometry, ultrasonic spectroscopy, near-infrared spectroscopy, online gel permeation chromatograph, ultraviolet visible spectroscope, among others. In some implementations, the in-line sensors can be used to capture/assess various characteristics such as apparent viscosity or other process parameters, and the machine learning model can be configured to determine the intrinsic viscosity, melt flow index, other types of rheological properties, etc., of the plastic material.

In some cases, a sensor can include a hyperspectral imaging sensor, e.g., a device configured to capture images across multiple wavelengths. In some implementations, this can be particularly suited for the machine learning model to generate predictions for melt flow and/or level of degradation of plastic material (e.g., plastic granules) using hyperspectral sensor measurements.

In some implementations, imaging sensors such as cameras can include one or more types of contrast lenses to filter sensor measurements to a particular wavelength or a range of wavelengths, e.g., to improve signal-to-noise ratio by capturing measurements that are more prominent in some wavelengths compared to other wavelengths. In some cases, filtering wavelengths in the imaging sensors can prevent saturation for the sensor, e.g., reducing a likelihood of a particular wavelength saturating detectors in a sensor. Filtering wavelengths can also improve tracking and detectability of some types of plastic, as some materials and composites have increased sensitivity to a particular wavelength.

In some cases, sensor measurements can include three-dimensional measurements (e.g., by laser) to determine cubic volume of plastic material, which can provide a more accurate measurement of volume compared to two-dimensional measurements (e.g., by 2D imaging). The 3D measurements for volume provide additional height/depth information that is absent from 2D measurements or measurements extrapolated from 2D measurements. Volume and other 3D measurements can be captured by 3D scanning, holographic imaging, etc.

In some cases, samples of plastic material can be collected during the plastic recycling process and tested offline. Any collected samples can include timestamps to correlate laboratory results from the sample to the plastic recycling process, e.g., for use by the machine learning model. Some examples of offline testing of samples can include Fourier-Transform Infrared Spectroscopy (FTIR), attenuated total reflectance FTIR, Raman spectroscopy, fluorescence spectroscopy, Laser Induced Breakdown Spectroscopy (LIBS), X-Ray analytical techniques (e.g., X-Ray diffraction, X-Ray Transmission, X-Ray Fluorescence), and mass spectrometry. The machine learning model 132 can be trained using analyzed samples of plastic material. In some cases, these spectroscopy techniques can used to determine intrinsic viscosity, melt flow, and other types of rheological properties of the plastic materials. In some implementations, offline techniques (such as FTIR, X-Ray, Raman Spectroscopy, LIBS, etc.,) can be performed by in-line sensors of the system 100 to provide real-time or near real-time measurements of the streams of plastic material.

For example, the machine learning model 132 can trained based on data collected by a sensor configured to apply dual comb spectroscopy infrared (DCS-IR) techniques to determine rheological properties, e.g., melt flow, melt flow index, intrinsic viscosity. In some implementations, the machine learning model 132 can be configured to apply weightings to different datasets corresponding to different spectroscopy techniques, as some types of spectroscopy techniques provide higher resolution data than other types of spectroscopy techniques. For example, the machine learning model 132 can assign higher weightings to plastic material data collected by DCS-IR techniques (e.g., a high-resolution spectroscopy technique) than other spectroscopy techniques with a lower resolution, e.g., FTIR spectroscopy. In this way, the machine learning model 132 can utilize high-resolution input sensor data of the plastic material to improve accuracy and precision of an administration scheme generated based on the high-resolution input sensor data, e.g., compared to lower-resolution techniques applied to obtain lower-resolution data.

Other examples of Raman techniques can include Shifted Excitation Raman Difference Spectroscopy (SERDS), Multiplex Raman Spectroscopy (MRS) and Spatially Offset Raman Spectroscopy (SORS), which may be preferred for plastics in a recycling process. For example, SERDS may be performed to improve signal quality by reducing the effect of background fluorescence of the plastic material. As another example, MRS may be performed to obtain multiple Raman spectra across different wavelengths or spectral ranges. In some cases, variations between types of plastic can be relatively small, and MRS can allow for detectability of variations that otherwise would not be captured by other spectroscopy techniques. As another example, MRS can allow for the detection of additives and/or fillers in plastic material that would otherwise be difficult to detect at a single Raman spectrum, whereas multiplexing multiple Raman spectra can allow for detection of trace amounts of said additives and/or fillers. In some cases, SORS may be preferred for plastic material that include multiple layers and/or coatings, as the spatial offsets in SORS can allow for separate of surface signals from subsurface or bulk signals, e.g., the deeper layers beneath a surface of plastic material.

In some implementations, offline techniques can include techniques for determining additive (e.g., stabilizer, other types of modifiers) levels in plastic material, such as level (e.g., amount) of antioxidant in the plastic material. Examples of offline techniques for detecting additives (e.g., including stabilizers) can include Differential Scanning calorimetry (DSC), Oxidation-Induction Time (OIT), Chemiluminescence tests, Dynamic Mechanical Analysis (DMA), Microscale Combustion calorimetry (MCC), and Thermogravimetric Analysis (TGA). The system 100 can perform offline techniques to determine additive levels in plastic material, which can relate to susceptibility of degradation of polymers in plastic material. The system 100 can achieve a control scheme that maintains additive levels of plastic material and reduce a likelihood of degrading plastic. In this way, the system 100 can be configured to correlate sensor measurements to additive levels of plastic material and generate administration schemes based on maintaining the additive levels for output plastic material, e.g., including minimizing degradation indicated by a lower level of additive.

As an example, the system 100 can correlate sensor measurements to a presence (or lack thereof) of a particular type of additive, e.g., an antioxidant or antioxidant level, in the plastic material. The system 100 can generate, based on the detected amount of additive, e.g., antioxidant level, an administration scheme that results in maintenance or an adjustment in the amount of the additive. Examples of additives can include different classes of stabilizers, e.g., light stabilizers, ultraviolet stabilizers. In another example, the system 100 can generate, based on the detected amount of flame retardant, an administration scheme that results in maintenance or an adjustment in the amount of flame retardant, e.g., to impart a target amount of flame resistance to the plastic material.

In some implementations, sensors can include detectors for volatile organic compounds (VOCs), such as photoionization detectors, electrochemical sensors, metal oxide sensors, among other types of sensors for monitoring VOCs during the plastic recycling process. In this way, the sensors can provide real-time measurements of VOCs and in turn, the machine learning model can generate administration schemes that can reduce the emission of VOCs in the plastic recycling process. In some implementations, sensors can include devices configured to perform techniques include Headspace Solid Phase Microextraction (HS-SPME), Gas Chromatography-Mass Spectrometry (GC-MS), Fourier-Transform Infrared (FTIR) Spectroscopy, Attenuated Total Reflectance (ATR) FTIR, Infrared (IR) Spectroscopy, Tunable Diode Laser Absorption Spectroscopy (TDLAS), among other types of spectroscopy techniques. Operations of the process 300 includes determining, based on the sensor input using a machine-learning model, a target set of characteristics of an output material of the plastic recycling system and an administration scheme associated with a set of additives to be added to the input stream of material within the plastic recycling system to obtain the target set of characteristics of the output material (304). The machine learning model 132, can be trained to determine the administration scheme 134, As described in reference to FIG. 2 above, the machine learning model 132 can be trained to improve predictions that characterize a dosages quantity and dosage timing to apply to streams of plastic material, e.g., by the engine 130. The target set of characteristics include at least one of a (i) physical characteristic or (ii) a mechanical characteristic of the output material, e.g., output stream 120 of plastic material.

In some cases, the administration scheme 134 includes control signals, e.g., control signal 136, to configure operation of plant devices in the plastic recycling system. In some cases, the control signal is a set of plant device settings that configure the plant device to achieve an amount of additive (e.g., a target dosage) to be applied a particular time (e.g., a dosage timing). Examples of the additives can include dyes, colorants, masterbatch, compatibilizers, fillers, reinforcements, flame retardants, stabilizers, among other types of additives used in the plastic recycling process. In some cases, colorants can include dyes, pigments, and other examples of additives that affect changes in color of the plastic material. Examples of stabilizers can include antioxidants (e.g., to reduce or prevent oxidation of plastic material), metal scavengers (e.g., to bind and remove metal ions in plastic material), acid scavengers (e.g., to absorb or neutralize acidic byproducts or contaminants in plastic material), etc. In some cases, additives can be referred to as functional additives and can include lubricants, impact modifiers, agents (e.g., antistatic, foaming, coupling, nucleating), biocides/anti-microbials, among other types of performance modifiers. In some cases, the plant device is configured to apply a target amount of chemical (e.g., an additive).

In some implementations, the control signal to configure the operations of the plant devices 106 can include adjusting device parameters such as motor rotations per minute, processing speed (e.g., process conveyance time), electrical characteristics of the plant device (e.g., current, voltage), among other parameters. For example, the process conveyance time can include the amount of time a stream of plastic material is being processed, e.g., during which the plastic is shredded, melted, or having a dosage of additive being administered.

In some implementations, the administration scheme includes, for each additive in the set of additives, at least one of a corresponding administration time and/or a dosage. The administration time indicates a time to apply the administration dosage to the input stream of material, and the administration dosage indicates an amount of additive to apply to input stream of material.

In some implementations, the physical characteristic can include at least one of (i) color, (ii) conductivity, (iii) density, (iv) size, (v) shape, or (vi) volume, of the output material. In some implementations, the mechanical characteristic can include at least one of (i) strength, (ii) stiffness, (iii) hardness, or (iv) toughness, of the output material. In some cases, physical and/or mechanical characteristics can include polymer weights, chain lengths (e.g., attributes related to melt flow), melt flow index, melt flow, intrinsic viscosity, and other types of rheological characteristics of plastic material. Examples of mechanical properties can include tensile strength, impact strength, sheer strength, and other types of mechanical characteristics of materials. Examples of physical properties can include density and specific gravity, moisture content, water absorption, melt flow index, bulk density, opacity and transparency, color, appearance, and other types of physical characteristics of materials.

The techniques described in this specification need not be limited to mechanical and/or physical characteristics or properties of materials. For example, the model 132 characteristics can include thermal properties, such as melting point, temperatures (e.g., heat deflection temperature), thermal conductivity, thermal expansion, etc.

In some cases, physical and mechanical characteristics of the plastic material can include volatile organic compound (VOC) content, VOC gassing, or other types of VOC characteristics. In some implementations, the machine learning model 132 can be configured to determine and monitor VOC characteristics during the plastic recycling process. The machine learning model 132 can be configured to determine and provide an administration scheme that reduces VOC offsets as streams of plastic material are processed by the plant recycling system. In this way, the machine learning model can pre-emptively detect and reduce VOCs (including odors released) that would otherwise encapsulate with additives in the plastic material, thereby reducing the likelihood of adverse health effects, pollution, and other types of risks resulting from VOCs.

Operations of the process 300 includes the step of generating a control signal configured to affect a control system for adjusting the set of additives within the plastic recycling system in accordance with the administration scheme (306). In some implementations, the process 300 includes providing the control signal to the control system of the plastic recycling system and adjusting the set of additives of the plastic recycling system to follow the administration scheme. The plastic recycling system following the administration scheme can include applying the set of additives to the input stream of material.

In some implementations, operations of the process 300 can include training the machine learning model 132. The engine 130 can be configured to train the machine learning model, e.g., using a model training module 212 described in reference to FIG. 2 above. The machine learning model is trained using a training stream of material as input, e.g., as a training example 204 from training data 202. The training stream of material can include a tracer (e.g., a chemical tracer, a pellet with a particular color signal) identifying plastic from the training stream of materials. A tracer can be added to at least a portion (e.g., a pellet, a flake, a granule) of the input plastic material. For example, a marker embedded into the plastic material during recycling can constitute a tracer. In some implementations, an added tracer can be detected throughout the recycling process of the plastic material by the sensors 108 or 116. The sensor measurements can be correlated to the tracer to generate a training example for the machine learning to learn to apply an administration control scheme.

In some cases, the tracer is a chemical tracer, e.g., a fluorescent dye, or an isotopic marker. In some cases, the tracer can have a unique characteristic (e.g., color) relative to the stream of plastic material, such that the tracer generates a signal corresponding to the unique characteristic. For example, a tracer of a particular color may be detected via a corresponding signal while the plastic material is processed, e.g., in a molten state.

In some implementations and referring to FIG. 1, a plastic characteristic engine (e.g., engine 130) of the plastic recycling system (e.g., system 100) can be configured to couple sensor measurements to the tracer for the plastic material to determine a control signal. For example, the conveyor system 114 can include encoders configured to measure parameters relating to the transport of plastic material throughout the system 100, such as rotations per minute. For example, the encoders can be configured to measure rotations per minute (RPM) of the conveyors, and the engine can be configured to determine travel distance, speed, direction, etc. of a stream of plastic material based on the RPMs of the conveyors. The transport parameters (also referred to as "machine indicators") for the plastic material can be correlated to the detection of a tracer in the stream of plastic material, e.g., by sensors of the system 100. The engine 130 can utilize the combination of a tracer and transport parameters to calibrate plant devices and improve precision for a control system, e.g., to adjust additives in accordance with a control scheme. Other examples of transport parameters can include amperes per RPM and temperature.

In some implementations, any of the sensors 108, 116, and 122 can include a rheological sensor, e.g., a rheometer. The engine 130 can be configured to correlate rheological measurements such as melt pressure with the machine indicators (e.g., transport parameters) for the conveyors of the system 100. For example, the engine 130 can determine sheer based on melt pressure and transport parameters such as amperes per RPM, temperature, etc., which can be used to determine melt properties of the plastic material processed by the system 100. As another example, the system 100 can also include hyperspectral fingerprints (e.g., spectral measurements) from camera sensors to determine the melt properties of plastic material. The engine 130 can proactively determine and apply dosages of modifying additives to the plastic material to achieve a target characteristic. Examples of modifying additives can include nucleating agents, chain extenders (reactive additives), inorganic fillers, elastomeric additives, peroxide-based additives, plasticizers, waxes, processing aids, etc.

Referring to process 300, training the model 132 can include providing sensor input indicative of a first set of characteristics of the training stream of material to the machine learning model and providing a target set of characteristics of an output training stream of material of the plastic recycling system to the machine learning model.

The training can include determining, e.g., by the machine learning model 132, a training administration scheme, e.g., an example of a model output 210, associated with a set of additives to be added to the training stream of material within the plastic recycling system to obtain the target set of characteristics of the output training stream of material. The training can include applying the set of additives to the training stream of material to obtain the output training stream of material and obtaining additional sensor input indicative of an output set of characteristics of the output training stream of material. The training can include comparing the output set of characteristics of the output training stream of material to the target set of characteristics of the output training stream of material. Based on the comparison of the output set of characteristics to the target set of characteristics, the training can include updating parameters of the model. For example, the output analyzer 214 of FIG. 2 can be configured to compare the output set of characteristics to the target set of characteristics, while the parameter adjuster 216 of FIG. 2 can be configured to generate updated parameters 218 for the model 132.

Figure 4:
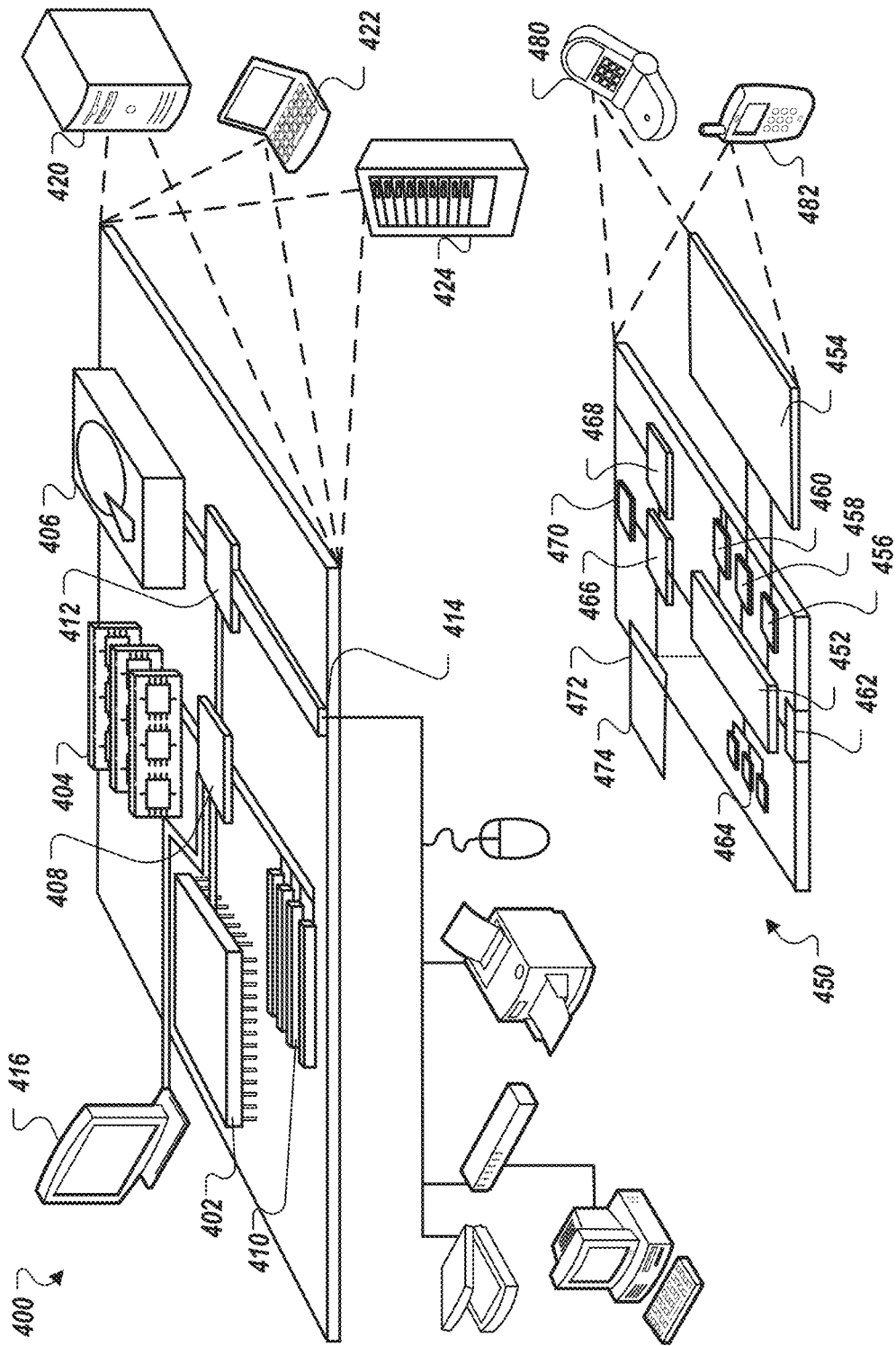
FIG. 4 is a diagram illustrating an example of a computing system that is used to implement technology described herein.

FIG. 4 is a diagram illustrating an example of a computing system that is used to implement technology described herein. For example, the computing system can be used for plastic monitoring and feedforward adjustment of additives consumed during plastic recycling processes.

The computing system includes computing device 400 and a mobile computing device 450 that can be used to implement the techniques described herein. For example, one or more components of the plastic recycling system 100 could be an example of the computing device 400 or the mobile computing device 450, such as the computing device 102, plastic characteristic engine 130, including a server that accesses or stores information regarding the operations performed by the computing device 102.

The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, mobile embedded radio systems, radio diagnostic computing devices, and other similar computing devices. The components shown here, their connections and relationships, and their functions, are meant to be examples only and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a Graphical User Interface (GUI) on an external input/output device, such as a display 416 coupled to the high-speed interface 408.

In other implementations, multiple processors and/or multiple buses may be used, as appropriate, along with multiple memories and types of memory. In addition, multiple computing devices may be connected, with each device providing portions of the operations e.g., as a server bank, a group of blade servers, or a multi-processor system. In some implementations, the processor 402 is a single threaded processor. In some implementations, the processor 402 is a multi-threaded processor. In some implementations, the processor 402 is a quantum computer.

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or include a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine-readable mediums (for example, the memory 404, the storage device 406, or memory on the processor 402).

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 e.g., through a graphics processor or accelerator, and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports e.g., USB, Bluetooth, Ethernet, wireless Ethernet, may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device, such as a mobile computing device 450. Each of such devices may include one or more of the computing devices 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may include appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450 or may also store applications or other information for the mobile computing device 450. Specifically, the expansion memory 474 may include instructions to carry out or supplement the processes described above and may include secure information also. Thus, for example, the expansion memory 474 may be provided as a security module for the mobile computing device 450 and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (nonvolatile random-access memory). In some implementations, instructions are stored in an information carrier such that the instructions, when executed by one or more processing devices e.g., processor 452, perform one or more methods, such as those described above. The instructions can also be stored by one or more storage devices, such as one or more computer or machine-readable mediums e.g., the memory 464, the expansion memory 474, or memory on the processor 452. In some implementations, the instructions can be received in a propagated signal, for example, over the transceiver 468 or the external interface 462.

The mobile computing device 450 may communicate wirelessly through the communication interface 466, which may include digital signal processing circuitry in some cases. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), LTE, 4G/5G cellular, among others. Such communication may occur, for example, through the transceiver 468 using a radio frequency. In addition, short-range communication may occur, such as using a Bluetooth, Wi-Fi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound e.g., voice messages, music files, among others, and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

In conclusion, these techniques described herein will improve efficiency of plant recycling systems to reduce extraneous operating cycles of the system, e.g., to prevent the waste of additives and electrical power consumed when processing plastic material. Increasing the efficiency of plant recycling systems can more efficiently generate plastic product from plastic waste, thereby mitigating the effects of plastic pollution. A plastic recycling system configured to perform the machine learning-based approach to monitoring plastic recycling processes can increase the amount of usable plastic, rather than said plastic going to landfills. Reducing extraneous usage of additives and recycling processes performed the plastic recycling system can also result in reduced carbon emissions, thereby mitigating the effects of climate change.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data e.g., one or more scripts stored in a markup language document, in a single file dedicated to the program in question, or in multiple coordinated files e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM (erasable programmable read-only memory), EEPROM (electrically erasable programmable read-only memory), and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the invention have been described. Other embodiments are within the scope of the following claims. For example, the steps recited in the claims can be performed in a different order and still achieve desirable results.

What is claimed is:

1. A method for additive adjustments in a plastic recycling system, the method comprising:
    obtaining sensor input indicative of one or more characteristics of an input stream of material into the plastic recycling system;
    determining, based on the sensor input using a machine-learning model, a target set of characteristics of an output material of the plastic recycling system, wherein the machine-learning model is trained to:
        predict an administration scheme associated with a set of additives to be added to the input stream of material within the plastic recycling system to obtain the target set of characteristics of the output material, wherein the target set of characteristics include at least one of a (i) physical characteristic or (ii) a mechanical characteristic of the output material; and
        generate a control signal configured to cause a control system to adjust the set of additives within the plastic recycling system in accordance with the administration scheme;
    generating, by the machine-learning model and based on the sensor input, the control signal; and
    providing the control signal to the control system.

2. The method of claim 1, wherein the sensor input comprises sensor measurements captured by one or more of (i) an optical sensor, (ii) a laser spectrometer, (iii) an infrared sensor, (iv) a capacitor sensor, or (v) an in-line optical fiber.

3. The method of claim 1, wherein the administration scheme comprises, for each additive in the set of additives, a corresponding administration time and an administration dosage, each administration time corresponding to each administration dosage, wherein the administration time indicates a time to apply the administration dosage to the input stream of material, and wherein the administration dosage indicates an amount of additive to apply to input stream of material.

4. The method of claim 1, wherein the set of additives comprises at least one of (i) dyes/colorants, (ii) masterbatch, (iii) compatibilizers, (iv) fillers/reinforcements, (v) stabilizers, or (vi) modifiers.

5. The method of claim 1, wherein the physical characteristic comprises at least one of (i) color, (ii) conductivity, (iii) density, (iv) size, (v) shape, or (vi) volume, of the output material.

6. The method of claim 1, wherein the mechanical characteristic comprises at least one of (i) strength, (ii) stiffness, (iii) hardness, or (iv) toughness, of the output material.

7. The method of claim 1, further comprising:
    adjusting the set of additives of the plastic recycling system to follow the administration scheme, wherein following the administration scheme comprises applying the set of additives to the input stream of material.

8. The method of claim 1, wherein the one or more characteristics of the input stream of material comprises a first color composition of plastic in the input stream of material, and wherein the target set of characteristics comprises of the output material comprises a second color composition of plastic in the output material, the second color composition being different than the first color composition.

9. The method of claim 1, wherein the machine-learning model is trained by a training stream of material, the training stream of material comprising a tracer identifying plastic from the training stream of materials, the training of the machine-learning model comprising:
    providing sensor input indicative of a first set of characteristics of the training stream of material to the machine-learning model;
    providing a target set of characteristics of an output training stream of material of the plastic recycling system to the machine-learning model;
    determining, by the machine-learning model, a training administration scheme associated with a set of additives to be added to the training stream of material within the plastic recycling system to obtain the target set of characteristics of the output training stream of material;
    applying the set of additives to the training stream of material to obtain the output training stream of material;
    obtaining additional sensor input indicative of an output set of characteristics of the output training stream of material;
    comparing the output set of characteristics of the output training stream of material to the target set of characteristics of the output training stream of material; and
    based on the comparison of the output set of characteristics to the target set of characteristics, updating one or more parameters of the machine-learning model.

10. A plastic recycling system comprising:
one or more sensors configured to obtain sensor input indicative of one or more characteristics of an input stream of material into the plastic recycling system;
a computing device comprising a machine-learning model configured to determine a target set of characteristics of an output material of the plastic recycling system, wherein the machine-learning model is trained to predict an administration scheme associated with a set of additives to be added to the input stream of material by one or more plant devices of the plastic recycling system to obtain the target set of characteristics of the output material, wherein the machine-learning model is configured to generate a control signal configured to cause a control system to adjust the set of additives within the plastic recycling system in accordance with the administration scheme, and wherein the machine-learning model is configured to generate the control signal based on the sensor input; and
a control system configured to apply the set of additives to the input stream of material based on the control signal provided by the machine-learning model,
wherein the target set of characteristics include at least one of a (i) physical characteristic or (ii) a mechanical characteristic of the output material.

11. The system of claim 10, wherein the sensor input comprises sensor measurements captured by one or more of (i) an optical sensor, (ii) a laser spectrometer, (iii) an infrared sensor, (iv) a capacitor sensor, or (v) an in-line optical fiber.

12. The system of claim 10, wherein the administration scheme comprises, for each additive in the set of additives, a corresponding administration time and an administration dosage, each administration time corresponding to each administration dosage, wherein the administration time indicates a time to apply the administration dosage to the input stream of material, and wherein the administration dosage indicates an amount of additive to apply to input stream of material.

13. The system of claim 10, wherein the set of additives comprises at least one of (i) dyes/colorants, (ii) masterbatch, (iii) compatibilizers, (iv) fillers/reinforcements, (v) stabilizers, or (vi) modifiers.

14. The system of claim 10, wherein the physical characteristic comprises at least one of (i) color, (ii) conductivity, (iii) density, (iv) size, (v) shape, or (vi) volume, of the output material.

15. The system of claim 10, wherein the control system is configured to adjust the set of additives of the plastic recycling system to follow the administration scheme, wherein following the administration scheme comprises applying the set of additives to the input stream of material.

16. The system of claim 10, wherein the one or more characteristics of the input stream of material comprises at least one of (i) a color composition, or (ii) a polymer composition, of plastic in the input stream of material.

17. The system of claim 10, wherein the computing device is configured to train the machine-learning model using a training stream of material, the training stream of material comprising a tracer identifying plastic from the training stream of materials, the training of the machine-learning model comprising:
providing sensor input indicative of a first set of characteristics of the training stream of material to the machine-learning model;
providing a target set of characteristics of an output training stream of material of the plastic recycling system to the machine-learning model;
determining, by the machine-learning model, a training administration scheme associated with a set of additives to be added to the training stream of material within the plastic recycling system to obtain the target set of characteristics of the output training stream of material;
applying the set of additives to the training stream of material to obtain the output training stream of material;
obtaining additional sensor input indicative of an output set of characteristics of the output training stream of material;
comparing the output set of characteristics of the output training stream of material to the target set of characteristics of the output training stream of material; and
based on the comparison of the output set of characteristics to the target set of characteristics, updating one or more parameters of the machine-learning model.

18. A non-transitory computer-readable storage medium storing instructions that when executed by one or more processors of a computing device cause the one or more processors to perform operations comprising:
obtaining sensor input indicative of one or more characteristics of an input stream of material into a plastic recycling system;
determining, based on the sensor input using a machine-learning model, a target set of characteristics of an output material of the plastic recycling system, wherein the machine-learning model is trained to;
predict an administration scheme associated with a set of additives to be added to the input stream of material within the plastic recycling system to obtain the target set of characteristics of the output material, wherein the target set of characteristics include at least one of a (i) physical characteristic or (ii) a mechanical characteristic of the output material; and
generate a control signal configured to cause a control system to adjust the set of additives within the plastic recycling system in accordance with the administration scheme;
generating, by the machine-learning model and based on the sensor input, the control signal; and
providing the control signal to the control system.

19. The non-transitory computer-readable storage medium of claim 18, wherein the administration scheme comprises, for each additive in the set of additives, a corresponding administration time and an administration dosage, each administration time corresponding to each administration dosage, wherein the administration time indicates a time to apply the administration dosage to the input stream of material, and wherein the administration dosage indicates an amount of additive to apply to input stream of material.

* * * * *